(No Model.)
J. CHASE, Dec'd.
N. M. REDMAN, Administratrix.
FILTERING FAUCET.
No. 578,263.    Patented Mar. 2, 1897.
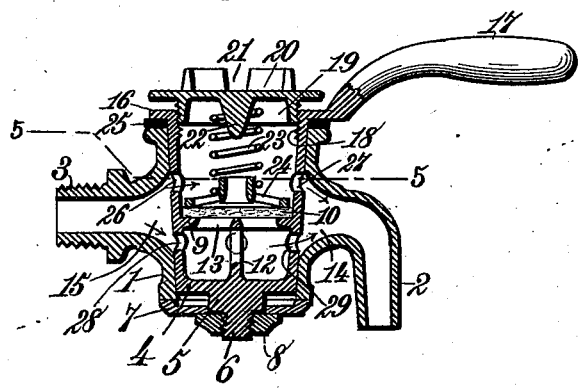
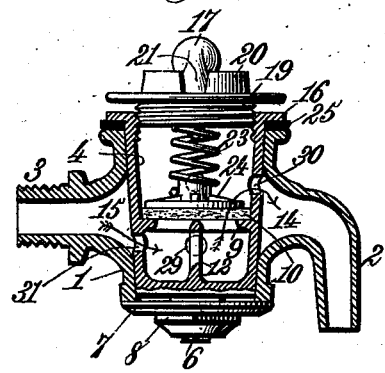
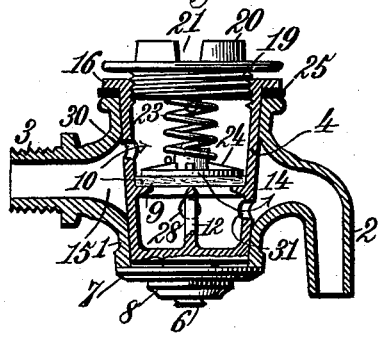
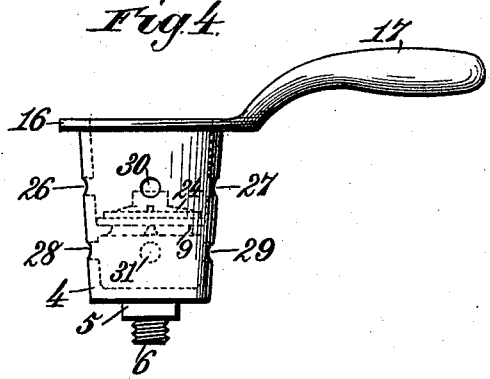
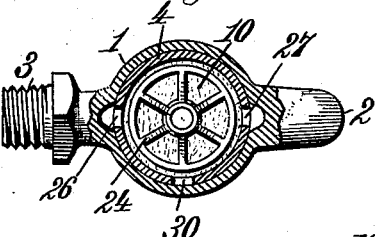
Witnesses.
Robert Everett
Albert H. Norris
Inventor.
Nellie M. Redman,
Admx of James Chase.
By James L. Norris.
Atty.
THE NORRIS PETERS CO., PHOTO-LITHO., WASHINGTON, D. C.

UNITED STATES PATENT OFFICE.

NELLIE M. REDMAN, OF PHILADELPHIA, PENNSYLVANIA, ADMINISTRATRIX OF JAMES CHASE, DECEASED, ASSIGNOR TO MINERVA A. CHASE, OF ROCHESTER, NEW YORK.

FILTERING-FAUCET.

SPECIFICATION forming part of Letters Patent No. 578,263, dated March 2, 1897.

Application filed May 18, 1896. Serial No. 592,010. (No model.)

*To all whom it may concern:*

Be it known that I, NELLIE M. REDMAN, (*née* NELLIE M. CHASE,) a citizen of the United States, residing at Philadelphia, Pennsylvania, administratrix of the estate of JAMES CHASE, late a citizen of Rochester, New York, deceased, do hereby declare that during his lifetime the said JAMES CHASE invented new and useful Improvements in Filtering-Faucets, of which the following is a full, clear, and exact specification.

This invention has for its objects to provide a new and improved filtering-faucet particularly designed for the water-inlet pipe of a dwelling, but useful wherever a liquid-filtering faucet is desired; to provide a filtering-faucet with new and improved means for causing the water or other liquid to flow either upward or downward through the filtering medium or direct to the discharge nozzle or spout without being forced through the filtering medium; to provide a new and improved filtering-faucet wherein the filtering medium does not require to be perforated for the passage of the rotary plug of the faucet; to provide the rotary plug of the faucet with a filtering medium which can be conveniently and quickly removed and replaced, or renewed through the upper end of the plug while the latter remains in the faucet-casing; to provide a filtering medium which is yieldingly held in proper position within the rotary plug of the faucet, and to provide means whereby the filtering medium is properly supported above and below, and is prevented from being unduly strained during the time the water passes upward or downward through the same.

To accomplish all these objects, the invention involves the features of construction and the combination or arrangement of parts hereinafter described and claimed, reference being made to the accompanying drawings, in which—

Figure 1 is a vertical central sectional view of a filtering-faucet constructed according to the present invention, the faucet-plug being shown in position for the flow of water to the discharge nozzle or spout without passing through the filtering medium. Fig. 2 is a similar view showing the plug adjusted for the flow of water upward through the filtering medium to the discharge nozzle or spout. Fig. 3 is a similar view showing the plug adjusted for the flow of water downward through the filtering medium to the nozzle or spout. Fig. 4 is a detail side elevation of the rotary faucet-plug, with parts on the interior thereof indicated by dotted lines; and Fig. 5 is a horizontal sectional view taken on the line 5 5, Fig. 1.

In the accompanying drawings, illustrating this invention, the numeral 1 indicates the casing of a faucet having a discharge spout or nozzle 2 and a screw-threaded nipple 3, adapted to be connected with a water-supply pipe in a manner similar to an ordinary faucet. The body of the casing is circular in cross-section, and internally it tapers from top to bottom with the least diameter at the lower end to receive and accurately fit the tapering faucet-plug 4, which is adapted to rotate in the casing. The lower end of the rotary plug is closed or imperforate and constructed with an annular or square projection 5, from which extends a short screw-threaded stem 6. The annular or square projection 5 is adapted to enter a similarly-shaped opening formed at the center of a disk 7, applied to the lower end of the faucet-casing, and a nut 8 engages the short screw-threaded stem 6 and bears against the disk 7, whereby the faucet-plug is detachably connected with the casing and is susceptible of being rotated therein.

The rotary plug is in the form of a hollow shell, and internally it is constructed with an annular flange or shoulder 9, on which rests the peripheral portion of a filtering medium 10. This filtering medium may be composed of an imperforate disk of felt, suitably prepared to filter water passing therethrough. It is to be understood, however, that as regards this filtering disk or medium it may be composed of any material suitable for the purpose in hand and be of any construction which will enable it to be removed and replaced or renewed through the upper open end of the faucet-plug, as will be obvious. The bottom wall of the plug is provided with a post or stud 12, having at its upper end a spider or other open-work or perforated support 13, which lies in the space bounded by the flange 9, and supports the filtering disk or medium against downward pressure when water is forced to descend therethrough.

The discharge nozzle or spout 2 of the faucet-casing is placed in communication with the interior of the casing 1 by means of a somewhat-elongated vertical passage 14, and the screw-threaded nipple 3 is placed in communication with the interior of the casing by means of a similar passage 15. These passages are of such dimensions or height as to extend above and below the filtering disk or medium 10.

The faucet-plug is provided at its upper end with a lateral flange or shoulder 16, which lies against the upper end of the faucet-casing. The flange or shoulder 16 is constructed with a suitable projecting handle 17, so that the plug can be rotated by grasping the handle and moving it in the required direction. The upper end of the plug is provided internally with a screw-thread, as at 18, into which is screwed a cap 19, having a head 20, constructed with notches, as at 21, for receiving an instrument, such as a knife or poker, by which the cap can be screwed and unscrewed. The lower side of the screw-cap 19 is provided at its center with a lug 22, entering the upper end of a spiral or other spring 23, which at its lower end bears against a spider 24. This spider is slightly arched and its peripheral portion or rim yieldingly presses the peripheral portion of the filtering-disk 10 down upon the flange or shoulder 9 of the rotary plug. A packing-ring 25 is interposed between the upper end of the casing and the flange 16 of the screw-cap, so that a tight joint can be effected and leakage avoided. The pressure of the spider 24 on the filtering-disk 10 is according to the power of the spring 23, which is placed under tension by screwing the cap 19 into the faucet-casing. The cap 19 can be easily unscrewed and the spring and spider removed to gain access to the filtering disk or medium, and obviously the latter can be very conveniently and quickly removed and replaced or renewed through the upper open end of the rotary plug, while the latter remains in operative connection with the faucet-casing.

The rotary plug of the faucet is provided above the filtering disk or medium with two diametrically opposite ports 26 and 27 and below the filtering disk or medium with two diametrically opposite ports 28 and 29. The plug is also provided in one side with a port 30, arranged centrally between the ports 26 and 27, and in the opposite side with a port 31, arranged intermediate between the ports 28 and 29. If the faucet-plug be turned by operating the handle 17 to place the latter at the front of the casing and over the discharge nozzle or spout, a supply of unfiltered water will be obtained, because the water entering the plug by the ports 26 and 28 above and below the filtering disk or medium will flow direct to the ports 27 and 29 and into the discharge nozzle or spout. If the faucet-plug be turned by its handle to place the port 30 in communication with the passage 14 and discharge nozzle or spout and the port 31 in communication with the passage 15 and inlet-nipple 3, the water will flow into the lower end of the plug and be forced to rise through the filtering disk or medium to flow off through the discharge nozzle or spout. If the plug be turned to place the port 31 in communication with the passage 14 and the discharge nozzle or spout and the port 30 in communication with the passage 15 and nipple 3, the inlet-water will flow into the upper end of the plug and be forced to descend through the filtering disk or medium to the discharge nozzle or spout. If the plug be turned so that all its ports are out of communication with the passages 14 and 15, the flow of water into the plug is shut off, and obviously during this time the filtering disk or medium can be removed and replaced or renewed, as before explained, while the plug itself remains within the faucet-casing. This is very important and advantageous, in that when the filter requires repairing or renewing it is unnecessary to cut off the supply of water in the street or at some other point.

The supports, composed of the spiders 13 and 24, are desirable and important in that they effectually sustain the filtering disk or medium during the time that water is flowing therethrough, and therefore the filtering-disk is not subjected to undue strain, and it is rendered more durable than if it were a simple disk of felt unsupported at its central portion.

The improved filtering-faucet is self-cleaning in that the water can be caused to pass first one way and then the other way through the filtering disk or medium; but in addition to this it is possible to secure any desired quantity of unfiltered water by simply adjusting the plug to the positon shown in Fig. 1, when the water will flow directly through the plug to the discharge nozzle or spout without passing through the filtering disk or medium. This is desirable for washing and other purposes where filtered water is not essential.

The spring 23, acted on by the screw-cap 19, effectually holds the filtering disk or medium upon the flange 9, so that no water can pass between the periphery of the filtering disk or medium and the internal surface of the plug. The power of the spring 23 should be sufficient to overcome the pressure of the water when the latter is introduced into the lower end of the plug and is forced to rise through the filtering disk or medium.

Various constructions of filtering-faucets have heretofore been proposed, but all are more or less objectionable, due to the difficulty of removing and replacing the filtering medium. In some faucets of this class the filtering medium lies in the faucet-casing and requires to be perforated for the passage of the faucet-plug and the barrel in which this plug is mounted. Consequently the filtering medium cannot be removed and replaced or renewed without removing the plug and disconnecting parts of the faucet-casing. In other faucets of this class the filtering medium or strainer has been soldered within a sectional tube arranged within the rotary plug, but this is an objectionable construction in that it is very difficult, if not impossible, to repair or renew the filter or strainer, and, besides, this cannot be accomplished without removing the tubes from the interior of the rotary plug. In the present invention the plug can be turned to cut off the flow of water thereinto and then the filtering disk or medium can be conveniently and quickly removed and replaced or renewed, as before stated.

Having thus described the invention of JAMES CHASE, what is claimed is—

1. The combination with a faucet-casing having an inlet and an outlet, and a rotary plug arranged in the casing and having upper and lower ports to communicate with said inlet and outlet, of a filtering disk or medium supported within the rotary plug between said upper and lower ports, a spider bearing against the filtering disk or medium, and a spring acting on the spider to press the same against the said filtering disk or medium, substantially as described.

2. The combination with a faucet-casing having an inlet and an outlet, of a rotary plug arranged in the casing and having upper and lower ports to communicate with said inlet and outlet, a filtering disk or medium detachably supported within the plug between said upper and lower ports and removable and replaceable through one end of the plug, a spider bearing against the filtering disk or medium, a spring acting upon the spider to press the same upon the filtering disk or medium, and a screw-cap screwed into one end of the rotary plug and acting to place the spring under tension, substantially as described.

3. The combination with a faucet-casing having an inlet and an outlet, of a rotary plug arranged in the casing and having an internal flange or shoulder and ports arranged above and below said flange or shoulder to communicate with the inlet and outlet of the casing, a filtering disk or medium detachably mounted on said flange or shoulder within the rotary plug, a spider bearing against the filtering disk or medium, and a spring acting upon the spider to press the same against the filtering disk or medium, substantially as described.

4. The combination with a faucet-casing having an inlet and an outlet, of a rotary plug arranged in the casing and having an internal flange or shoulder and ports arranged above and below said flange or shoulder to communicate with the inlet and outlet of the casing, a filtering disk or medium detachably mounted on said flange or shoulder within the rotary plug, a spider bearing against the filtering disk or medium, a spring acting upon the spider to press the same against the filtering disk or medium, and a screw-cap screwed into the upper end of the rotary plug and acting to place the spring under tension, substantially as described.

5. The combination with a faucet-casing having opposite passages 14 and 15 and an inlet 3 and discharge nozzle or spout 2 communicating, respectively, with said passages, of a rotary plug arranged within the casing and having an internal flange or shoulder, ports 26, 27, and 30 arranged above said flange or shoulder and ports 28, 29, and 31 arranged below said flange or shoulder, a filtering disk or medium detachably mounted on the flange or shoulder within the rotary plug, a spring-pressed device for yieldingly pressing the filtering disk or medium against the flange or shoulder of the plug, and means for turning the plug, substantially as described.

6. The combination with a faucet-casing having an inlet and an outlet, of a rotary, hollow plug arranged in the casing and having an internal flange or shoulder and ports located above and below said flange or shoulder to communicate with the inlet and outlet, a filtering disk or medium detachably mounted on the flange or shoulder within the rotary plug, a spider arranged under and supporting the filtering disk or medium, a spider arranged over and bearing against said filtering disk or medium, a spring acting against the uppermost spider, and means for placing the spring under tension, substantially as described.

In testimony whereof I have hereunto set my hand in the presence of two subscribing witnesses.

NELLIE M. REDMAN,
*Admx. of James Chase.*

Witnesses:
 THOS. J. HUNT,
 GEO. W. HUNT.